United States Patent
Ansari et al.

(10) Patent No.: US 11,630,644 B2
(45) Date of Patent: Apr. 18, 2023

(54) SERVICE FOR CONFIGURING CUSTOM SOFTWARE

(71) Applicant: Bank of America Corporation, Charlotte, NC (US)

(72) Inventors: Tarannum Salahuddin Ansari, Maharashtra (IN); Ramesh Alagar, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 176 days.

(21) Appl. No.: 17/331,994

(22) Filed: May 27, 2021

(65) Prior Publication Data

US 2022/0382524 A1 Dec. 1, 2022

(51) Int. Cl.
*G06F 8/34* (2018.01)
*G06N 20/00* (2019.01)
*G06N 5/02* (2023.01)
*G06F 8/33* (2018.01)
*G06F 40/106* (2020.01)
*G10L 15/22* (2006.01)
*G10L 15/18* (2013.01)
*G06F 40/20* (2020.01)
*G06F 40/186* (2020.01)

(52) U.S. Cl.
CPC ............ *G06F 8/34* (2013.01); *G06F 8/33* (2013.01); *G06F 40/106* (2020.01); *G06F 40/186* (2020.01); *G06F 40/20* (2020.01); *G06N 5/027* (2013.01); *G06N 20/00* (2019.01); *G10L 15/18* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | |
|---|---|---|
| 2002/0104069 A1 | 8/2002 | Gouge et al. |
| 2002/0162090 A1 | 10/2002 | Parnell et al. |
| 2003/0093433 A1 | 5/2003 | Seaman et al. |
| 2003/0117365 A1 | 6/2003 | Shteyn |
| 2005/0267889 A1 | 12/2005 | Snyder et al. |
| 2006/0195794 A1 | 8/2006 | Sun et al. |
| 2007/0162893 A1 | 7/2007 | Moosmann et al. |
| 2007/0168240 A1 | 7/2007 | Alfandary et al. |
| 2007/0203956 A1 | 8/2007 | Anderson et al. |

(Continued)

*Primary Examiner* — Isaac Tuku Tecklu
(74) *Attorney, Agent, or Firm* — Banner & Witcoff, Ltd.

(57) ABSTRACT

Aspects of the disclosure relate to design as a service for configuring custom software. A computing platform may receive natural language input from a user specifying a software customization request. The computing platform may convert the natural language input into a visual output corresponding to the software customization request. The computing platform may send the visual output to a user interface. The computing platform may receive a modification request from the user specifying, using natural language, one or more modifications to the visual output. The computing platform may modify, using natural language processing, the visual output based on the modification request. The computing platform may log the one or more modifications to the visual output in a tracking log. The computing platform may send the modified visual output to the user interface.

20 Claims, 8 Drawing Sheets

(56) References Cited

U.S. PATENT DOCUMENTS

| | | | |
|---|---|---|---|
| 2007/0266309 A1 | 11/2007 | Sellman | |
| 2007/0288853 A1 | 12/2007 | Neil | |
| 2008/0189680 A1* | 8/2008 | Brown | G06F 9/451 |
| | | | 717/106 |
| 2009/0064017 A1 | 3/2009 | Biniak et al. | |
| 2009/0077518 A1 | 3/2009 | Beckenbaugh et al. | |
| 2009/0150156 A1 | 6/2009 | Kennewick et al. | |
| 2010/0070289 A1 | 3/2010 | Haeberle et al. | |
| 2010/0313106 A1* | 12/2010 | Callens | G06F 40/166 |
| | | | 715/201 |
| 2011/0255790 A1 | 10/2011 | Duggan et al. | |
| 2011/0258596 A1 | 10/2011 | Bykov et al. | |
| 2013/0297544 A1 | 11/2013 | Allgaier | |
| 2015/0074546 A1* | 3/2015 | Slawson | G06F 8/65 |
| | | | 715/747 |
| 2015/0331676 A1* | 11/2015 | Faus | G06F 9/44505 |
| | | | 717/107 |
| 2016/0117293 A1* | 4/2016 | Dettman | G06F 40/143 |
| | | | 715/234 |
| 2016/0357519 A1* | 12/2016 | Vargas | G06F 40/40 |
| 2016/0357717 A1 | 12/2016 | Metz et al. | |
| 2017/0024404 A1 | 1/2017 | Tocchini et al. | |
| 2017/0139877 A1 | 5/2017 | Lee et al. | |

\* cited by examiner

SERVICE FOR CONFIGURING CUSTOM SOFTWARE

BACKGROUND

Aspects of the disclosure relate to computer software development. In particular, one or more aspects of the disclosure relate to configuring custom software.

Creating custom software, for example, designing user interfaces and process flows that, for example, then get built into software applications may be a laborious and error-prone task that requires expertise in various technical areas. In many instances, it may be difficult to use traditional tools to efficiently create design diagrams such as business process flows, work breakdown structures, process models, decision trees, hierarchical trees, and timeline charts, that may be validated across different languages, and across different organizations and their different requirements.

SUMMARY

Aspects of the disclosure provide effective, efficient, scalable, and convenient technical solutions that address and overcome the technical problems associated with configuring custom software. In particular, one or more aspects of the disclosure provide a centralized solution for configuring custom software. Additional aspects of the disclosure may provide the ability to accept input in different languages and formats. Additional aspects of the disclosure may provide a natural language processing interface that enables voice control of a design process. Additional aspects of the disclosure may provide techniques for evaluating a user request and providing suggestions during software product creation.

In accordance with one or more embodiments, a computing platform having at least one processor, a communication interface, and memory may receive natural language input from a user specifying a software customization request. Subsequently, the computing platform may convert the natural language input into a visual output corresponding to the software customization request. Next, the computing platform may send the visual output corresponding to the software customization request to a user interface. Thereafter, the computing platform may receive a modification request from the user specifying, using natural language, one or more modifications to the visual output. Then, the computing platform may modify, using natural language processing, the visual output based on the modification request. Then, the computing platform may log the one or more modifications to the visual output in a tracking log. Then, the computing platform may send the modified visual output to the user interface.

In some embodiments, receiving the natural language input from the user specifying the software customization request may include receiving voice or text input from the user.

In some arrangements, converting the natural language input into the visual output may include converting the natural language input into one or more of: a layout drawing, a timeline, a flowchart, or a mockup of a user interface.

In some examples, converting the natural language input into the visual output may include converting the natural language input based on one or more templates stored in a template library.

In some embodiments, converting the natural language input based on the one or more templates stored in the template library may include converting the natural language input based on one or more validated layouts associated with one or more validated components.

In some example arrangements, modifying the visual output based on the modification request may include modifying the visual output using a natural language processing engine trained on words specific to an enterprise.

In some embodiments, modifying the visual output based on the modification request may include selecting validated components from a component repository in accordance with a rules engine.

In some examples, modifying the visual output based on the modification request may include evaluating the modification request from the user and providing suggestions associated with the software customization request.

In some embodiments, modifying the visual output based on the modification request may include identifying user errors and sending notification information to the user based on the identified errors.

In some embodiments, the computing platform may add new rules to a rules engine, validate the new rules, and train a natural language processing engine based on the new rules.

In some embodiments, sending the modified visual output to a user interface may include sending a visual layout that is validated across different languages and different organizations.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
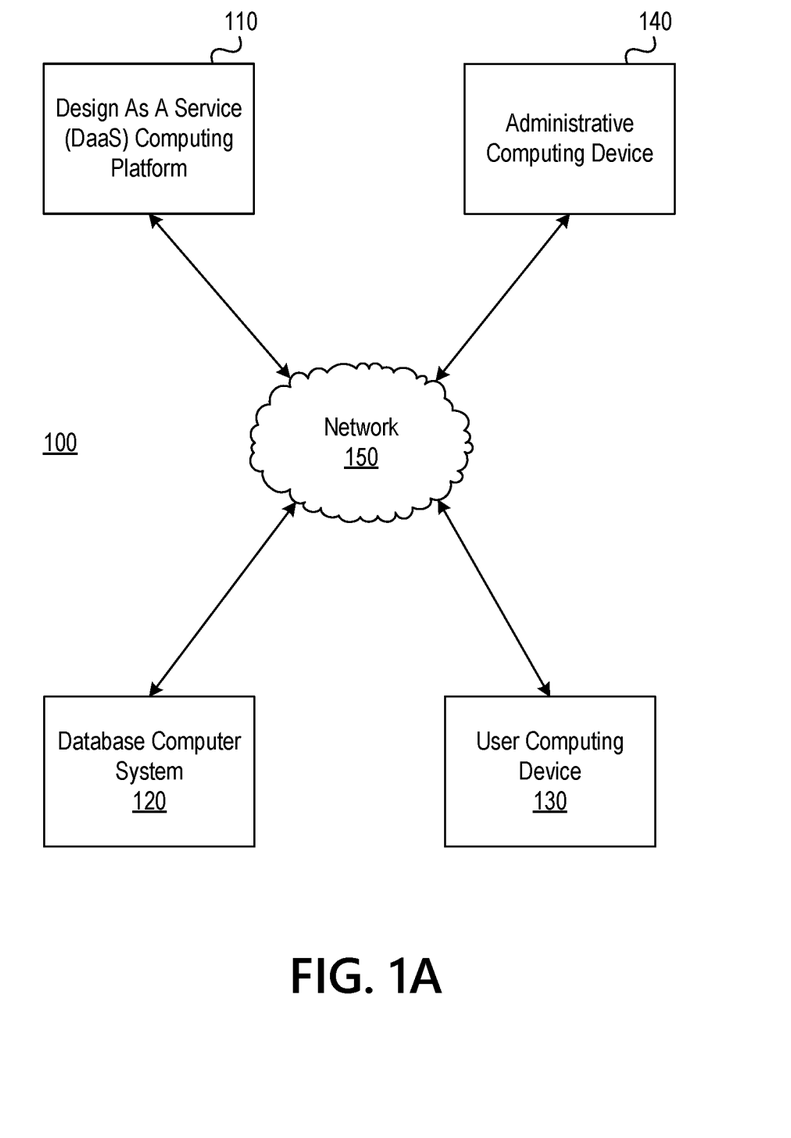
FIGS. 1A and 1B depict an illustrative computing environment for design as a service for configuring custom software in accordance with one or more example embodiments.
Figure 1B:
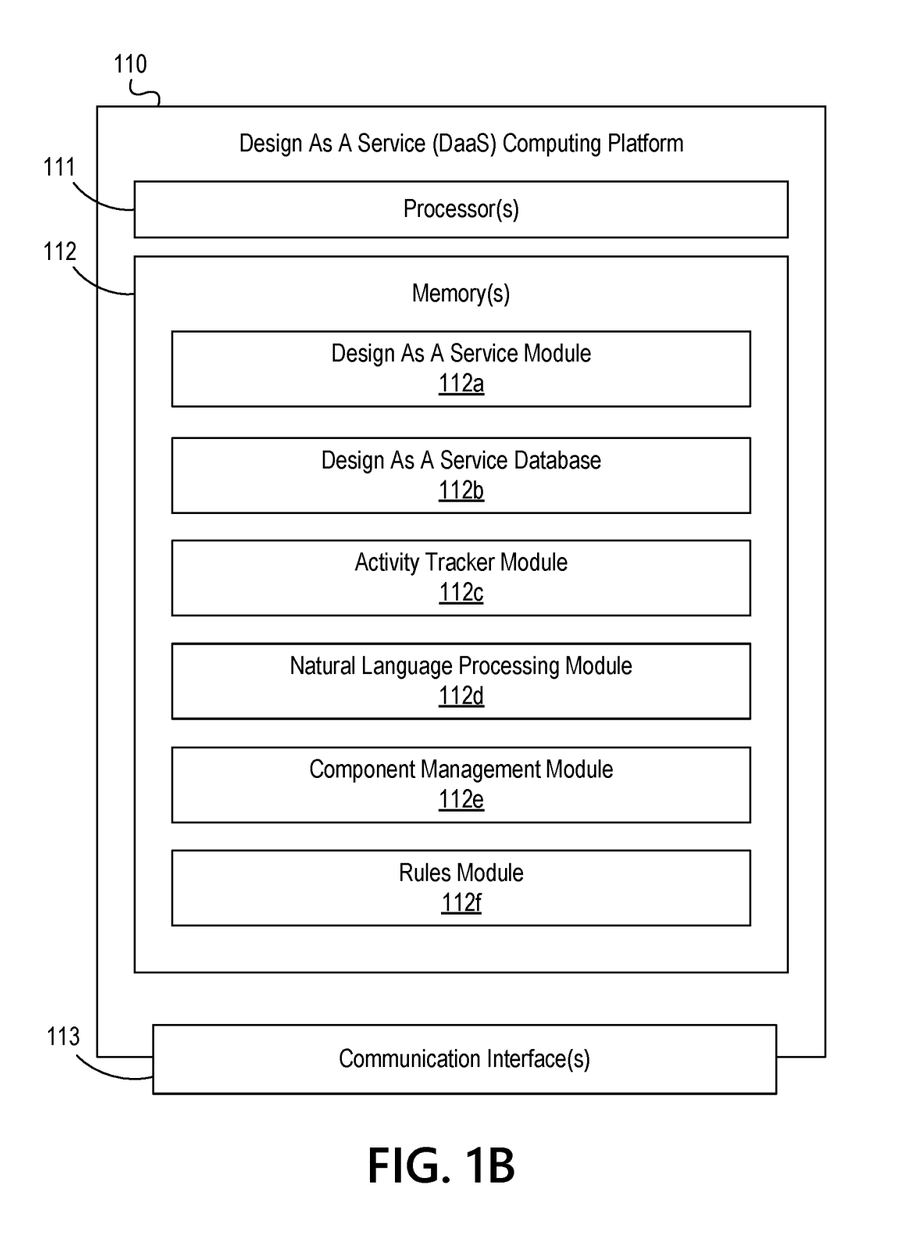

FIGS. 1A and 1B depict an illustrative computing environment for design as a service for configuring custom software in accordance with one or more example embodiments. Referring to FIG. 1A, computing environment 100 may include one or more computing devices and/or other computing systems. For example, computing environment 100 may include design as a service (DaaS) computing platform 110, database computer system 120, user computing device 130, and administrative computing device 140. Although one user computing device 130 is shown for illustrative purposes, any number of user computing devices may be used without departing from the disclosure. In addition, although one administrative computing device 140 is shown for illustrative purposes, any number of administrative computing devices may be used without departing from the disclosure.

As illustrated in greater detail below, design as a service computing platform 110 may include one or more computing devices configured to perform one or more of the functions described herein. For example, design as a service computing platform 110 may include one or more computers (e.g., laptop computers, desktop computers, servers, server blades, or the like).

Database computer system 120 may include different information storage entities storing design rules, validated software layouts, validated software design components, activity information (e.g., changes, additions, and/or edits made to a visual layout), a library of templates (e.g., for different types of projects), modified layouts, finalized layouts, and/or other information associated with software customization and development.

User computing device 130 may include one or more computing devices and/or other computer components (e.g., processors, memories, communication interfaces). For instance, user computing device 130 may be a server, desktop computer, laptop computer, tablet, mobile device, or the like, and may be used by a software developer, or the like. In addition, user computing device 130 may be associated with an enterprise organization operating design as a service computing platform 110.

Administrative computing device 140 may include one or more computing devices and/or other computer components (e.g., processors, memories, communication interfaces). For instance, administrative computing device 140 may be a server, desktop computer, laptop computer, tablet, mobile device, or the like, and may be used by a software development manager or the like. In addition, administrative computing device 140 may be associated with an enterprise organization operating design as a service computing platform 110.

Computing environment 100 also may include one or more networks, which may interconnect one or more of design as a service computing platform 110, database computer system 120, user computing device 130, and administrative computing device 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, design as a service computing platform 110, database computer system 120, user computing device 130, and administrative computing device 140 may be associated with an organization (e.g., a financial institution), and network 150 may be associated with and/or operated by the organization, and may include one or more networks (e.g., LANs, WANs, virtual private networks (VPNs), or the like) that interconnect design as a service computing platform 110, database computer system 120, user computing device 130, administrative computing device 140. Network 150 also may include a public sub-network that may connect the private sub-network and/or one or more computing devices connected thereto (e.g., design as a service computing platform 110, database computer system 120, user computing device 130, and administrative computing device 140) with one or more networks and/or computing devices that are not associated with the organization.

In one or more arrangements, design as a service computing platform 110, database computer system 120, user computing device 130, and administrative computing device 140 may be any type of computing device capable of receiving a user interface, receiving input via the user interface, and communicating the received input to one or more other computing devices. For example, design as a service computing platform 110, database computer system 120, user computing device 130, administrative computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, design as a service computing platform 110 may include one or more processor(s) 111, memory(s) 112, and communication interface(s) 113. A data bus may interconnect processor 111, memory 112, and communication interface 113. Communication interface 113 may be a network interface configured to support communication between design as a service computing platform 110 and one or more networks (e.g., network 150 or the like). Memory 112 may include one or more program modules having instructions that when executed by processor 111 cause design as a service computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of design as a service computing platform 110 and/or by different computing devices that may form and/or otherwise make up design as a service computing platform 110. For example, memory 112 may have, store, and/or include a design as a service module 112a, a design as a service database 112b, an activity tracker module 112c, a natural language processing (NLP) module 112d, a component management module 112e, and a rules module 112f. Design as a service module 112a may have instructions that direct and/or cause design as a service computing platform 110 to generate a visual layout that is validated across different languages and across different organizations and/or perform other functions, as discussed in greater detail below. Design as a service database 112b may store information used by design as a service module 112a and/or design as a service computing platform 110 in configuring custom software and/or in performing other functions. Activity tracker module 112c may track a user's activity for creating a knowledge graph associated with a software configuration. Natural language processing module 112d may have instructions that direct and/or cause design as a service computing platform 110 to convert natural language input (e.g., a user's voice and/or text requests) into a visual output corresponding to a software customization request.

Component management module 112e may have instructions that direct and/or cause design as a service computing platform 110 to set, define, and/or iteratively redefine software components and/or other components used by design as a service computing platform 110 and/or other systems in computing environment 100 in performing design as a service for configuring custom software. Rules module 112f may have instructions that direct and/or cause design as a service computing platform 110 to set, define, and/or iteratively redefine rules, techniques and/or other parameters used by design as a service computing platform 110 and/or other systems in computing environment 100 in performing design as a service for configuring custom software.

Figure 2A:
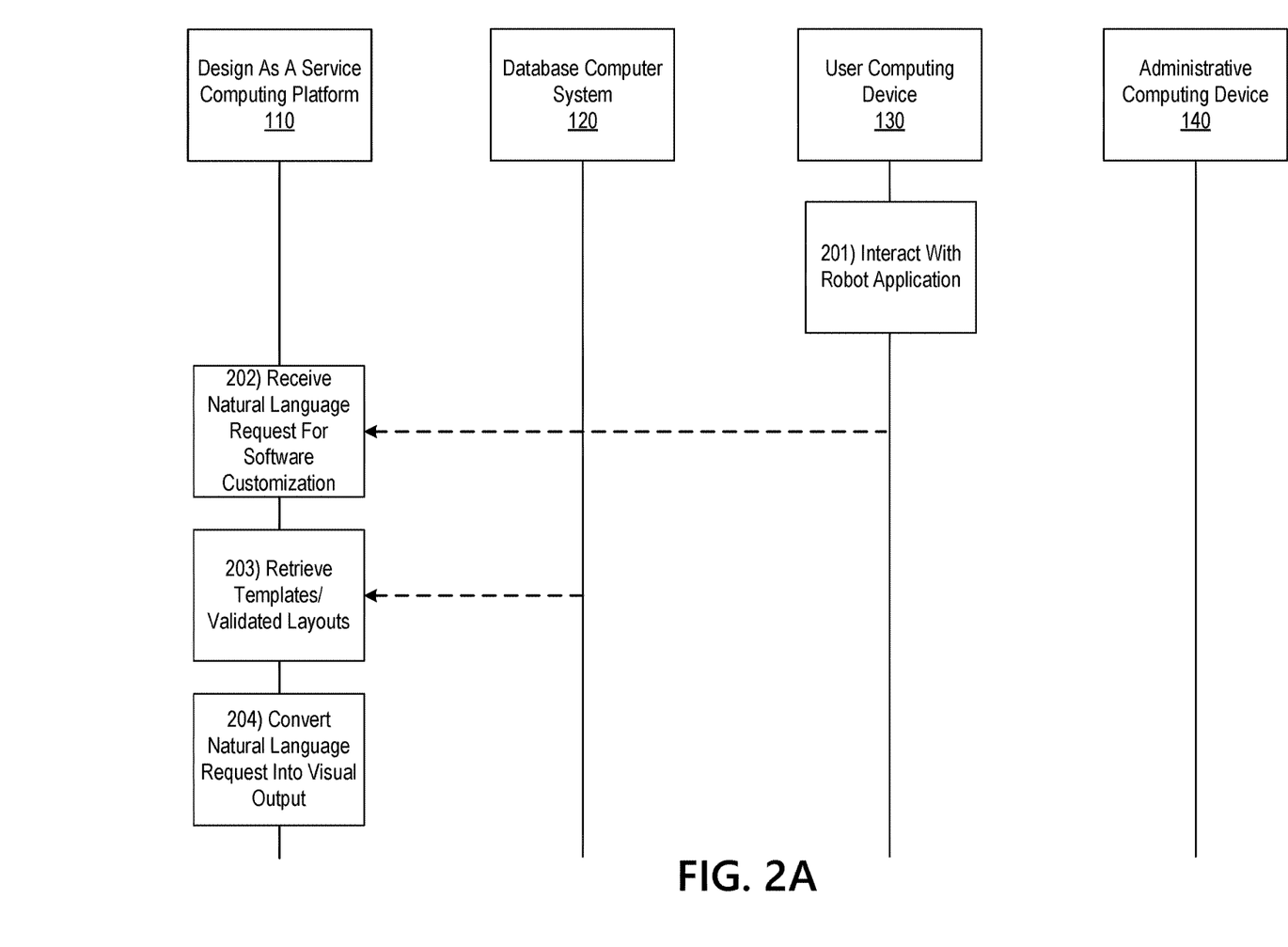
FIGS. 2A-2D depict an illustrative event sequence for design as a service for configuring custom software in accordance with one or more example embodiments.

FIGS. 2A-2D depict an illustrative event sequence for design as a service for configuring custom software in accordance with one or more example embodiments. Referring to FIG. 2A, at step 201, a user of a computing device (e.g., user computing device 130), may access and begin interacting with a robot application (e.g., a bot). For example, an application launched on the user computing device (e.g., user computing device 130) may enable the user to converse with a robot application (e.g., a bot) using a natural language interface. In some examples, the robot application (e.g., bot) may be capable of receiving voice or text input in multiple languages (e.g., in a language selected by the user), and providing responses in multiple languages (e.g., in a language selected by the user).

At step 202, design as a service computing platform 110 may receive, via the communication interface (e.g., communication interface 113), natural language input from a user specifying a software customization request. For example, design as a service computing platform 110 may receive voice and/or text input from the user for creating or narrating a custom software product or solution. In some examples, a natural language processing engine (e.g., natural language processing module 112d) may be used for understanding a user's voice and text requests from the robot application. In addition, the natural language processing engine (e.g., natural language processing module 112d) may be used to create a textual document for a custom software product or solution.

At step 203, design as a service computing platform 110 may retrieve, from a data store (e.g., database computer system 120), one or more templates based on the received natural language request and/or in accordance with rules stored in a rules engine (e.g., rules module 112f). For example, design as a service computing platform 110 may determine that a user desires to create a business process and may retrieve corresponding templates or flowcharts for creating a visual output associated with the business process. In another example, design as a service computing platform 110 may determine that a user desires to create a software application with a user interface and may retrieve corresponding templates for creating a visual output associated with the user interface.

At step 204, design as a service computing platform 110 may convert the natural language input into a visual output (e.g., an initial visual output) corresponding to the software customization request. For example, design as a service computing platform 110 may convert the natural language input into an initial layout drawing, an initial timeline, an initial flowchart, an initial mockup of a user interface, and/or the like corresponding to the software customization request. In some examples, design as a service computing platform 110 may convert the natural language input based on one or more templates stored in a template library (e.g., a template library of initial sets of layouts that have been validated and are linked with validated components).

Figure 2B:
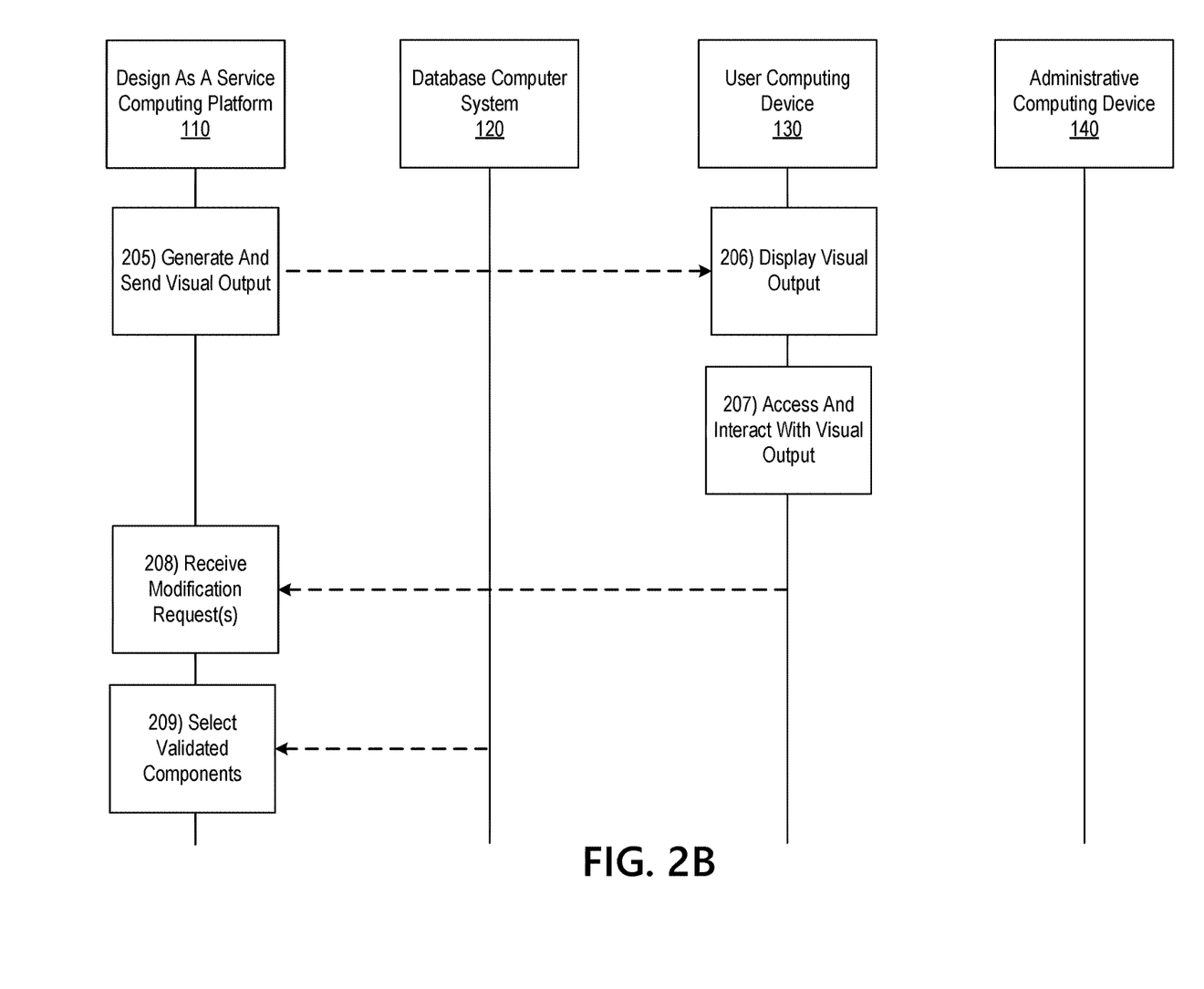
Figure 3:
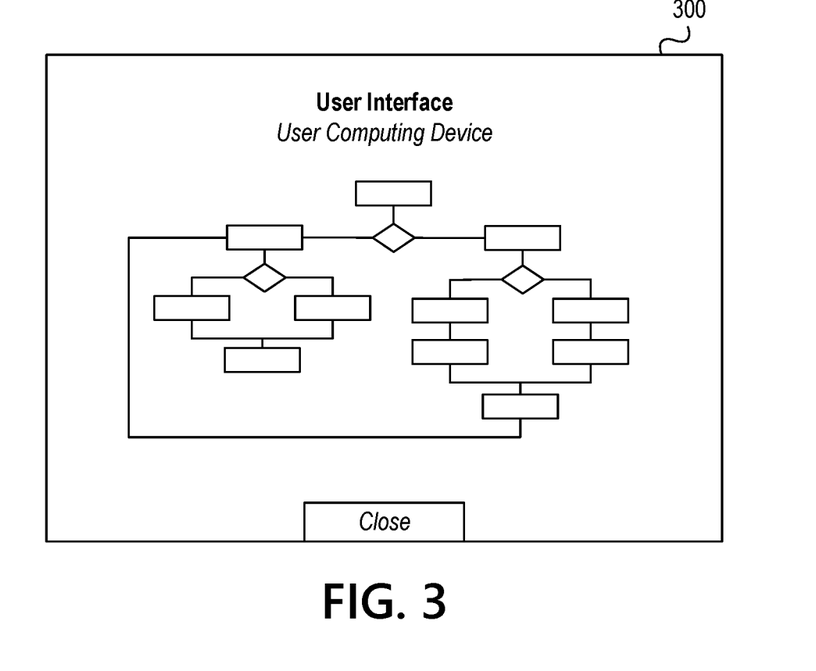
FIGS. 3 and 4 depict example graphical user interfaces for design as a service for configuring custom software in accordance with one or more example embodiments.

Referring to FIG. 2B, at step 205, design as a service computing platform 110 may generate and send, via the communication interface (e.g., communication interface 113), the visual output (e.g., initial visual output) corresponding to the software customization request to a user interface. In turn, at step 206, design as a service computing platform 110 may cause the user computing device (e.g., on a user interface of user computing device 130) to display and/or otherwise present the visual output (e.g., on a user interface). For example, design as a service computing platform 110 may cause the user computing device (e.g., user computing device 130) to display and/or otherwise present one or more graphical user interfaces similar to graphical user interface 300, which is illustrated in FIG. 3. As seen in FIG. 3, graphical user interface 300 may include text and/or other information associated with an initial visual output (e.g., an initial layout drawing or flowchart, as shown). It will be appreciated that other and/or different notifications may also be provided.

At step 207, the user of the user computing device (e.g., user computing device 130) may access and interact with the visual output (e.g., the initial visual output generated by design as a service computing platform 110 at step 205). For example, the user of the user computing device (e.g., user computing device 130), may access and interact with the visual output using voice or text input (e.g., in a language selected by the user). In some examples, accessing and interacting with the visual output may include modifying or requesting to modify the visual output. For instance, the user of the user computing device (e.g., user computing device 130) may modify an order of steps, a shape of an object, or the like.

At step 208, design as a service computing platform 110 may receive, via the communication interface (e.g., communication interface 113), a modification request from the user of the user computing device (e.g., user computing device 130) specifying, using natural language, one or more modifications to the visual output (e.g., the initial visual output). For example, modifying the visual output based on the modification request may include modifying the visual output using a natural language processing engine (e.g., natural language processing module 112d) trained on words specific to an enterprise.

At step 209, in modifying the visual output based on the modification request, design as a service computing platform 110 may select validated components from a component repository (e.g., via a component management module 112e) in accordance with a rules engine (e.g., rules module 112f).

Figure 2C:
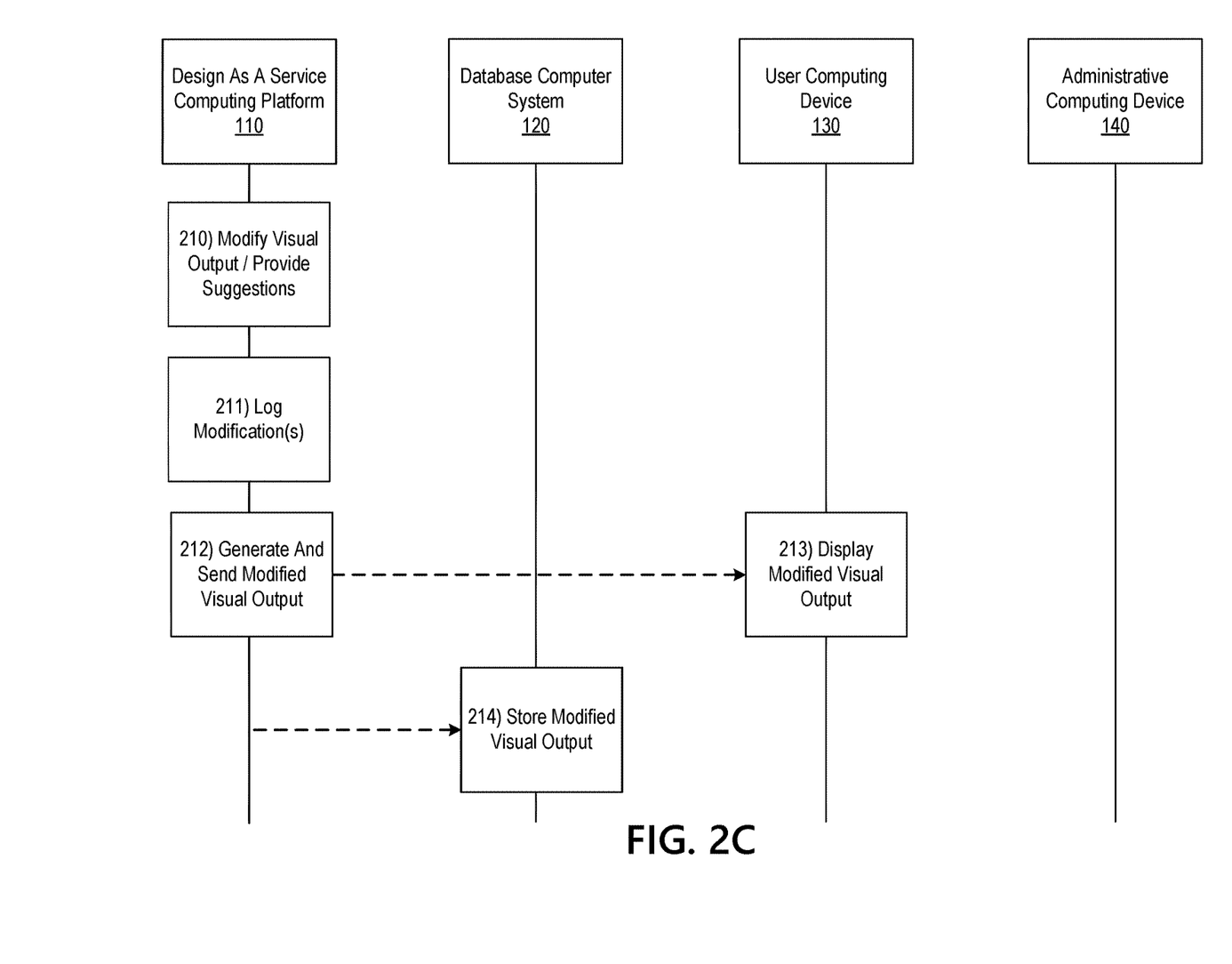

Referring to FIG. 2C, at step 210, design as a service computing platform 110 may modify, using natural language processing, the visual output based on the modification request. In addition, in modifying the visual output based on the modification request, design as a service computing platform 110 may evaluate the modification request from the user of the computing device (e.g., user computing device 130) and provide suggestions associated with the software customization request (e.g., suggest a next possible software component to use in a layout). For example, in modifying the visual output based on the modification request, design as a service computing platform 110 may identify user errors (e.g., during document or design creation) and send notification information to the user based on the identified errors. In this way, design as a service computing platform 110 may assist the user in creating a comprehensive, error-free product or solution. In addition, the design documentation may be in multiple languages.

At step 211, design as a service computing platform 110 may log (e.g., store) the one or more modifications to the visual output in a tracking log (e.g., activity repository). In some examples, design as a service computing platform 110 may track a user's activity (e.g., via activity tracker module 112c), and create a knowledge graph corresponding to a software product or solution according to the user activity data (e.g., changes, additions, edits, or other activity involving the visual layout). The knowledge graph may be used to update software documentation.

At step 212, design as a service computing platform 110 may generate and send, via the communication interface (e.g., communication interface 113), the modified visual output to the user interface (e.g., user interface of user computing device 130). For example, design as a service computing platform 110 may generate and send a modified layout drawing, a modified timeline, a modified flowchart, a modified mockup of a user interface, and/or the like corresponding to the modification request. In addition, the modified, or final, visual output may be validated across different languages and across different organizations.

Figure 4:
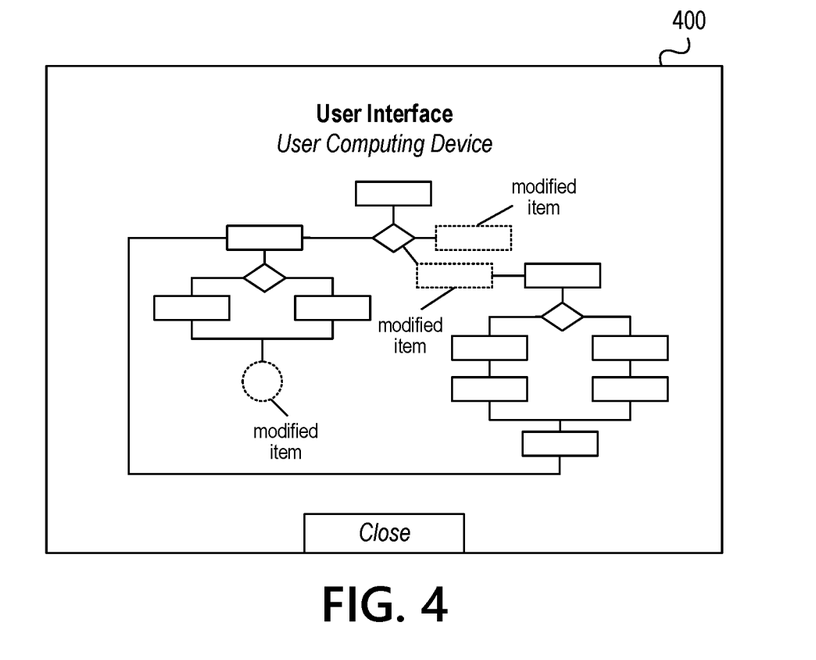

In turn, at step 213, design as a service computing platform 110 may cause the user computing device (e.g., user computing device 130) to display and/or otherwise present the modified visual output (e.g., on a user interface of user computing device 130). For example, design as a service computing platform 110 may cause the user computing device (e.g., user computing device 130) to display and/or otherwise present one or more graphical user interfaces similar to graphical user interface 400, which is illustrated in FIG. 4. As seen in FIG. 4, graphical user interface 400 may include text and/or other information associated with a modified, or final, visual output (e.g., a modified layout drawing or flowchart, as shown). It will be appreciated that other and/or different notifications may also be provided.

In some embodiments, design as a service computing platform 110 may narrate (e.g., read aloud) a walkthrough of a visual output in a language selected by a user (e.g., a user of user computing device 130). In this way, the process of software customization may be made more streamlined and less cumbersome for users in a multilingual group and visually impaired individuals, among other users.

At step 214, design as a service computing platform 110 may store the modified visual output in at least one database (e.g., database computer system 120), which may be maintained by the computing platform or any of the devices described herein.

Figure 2D:
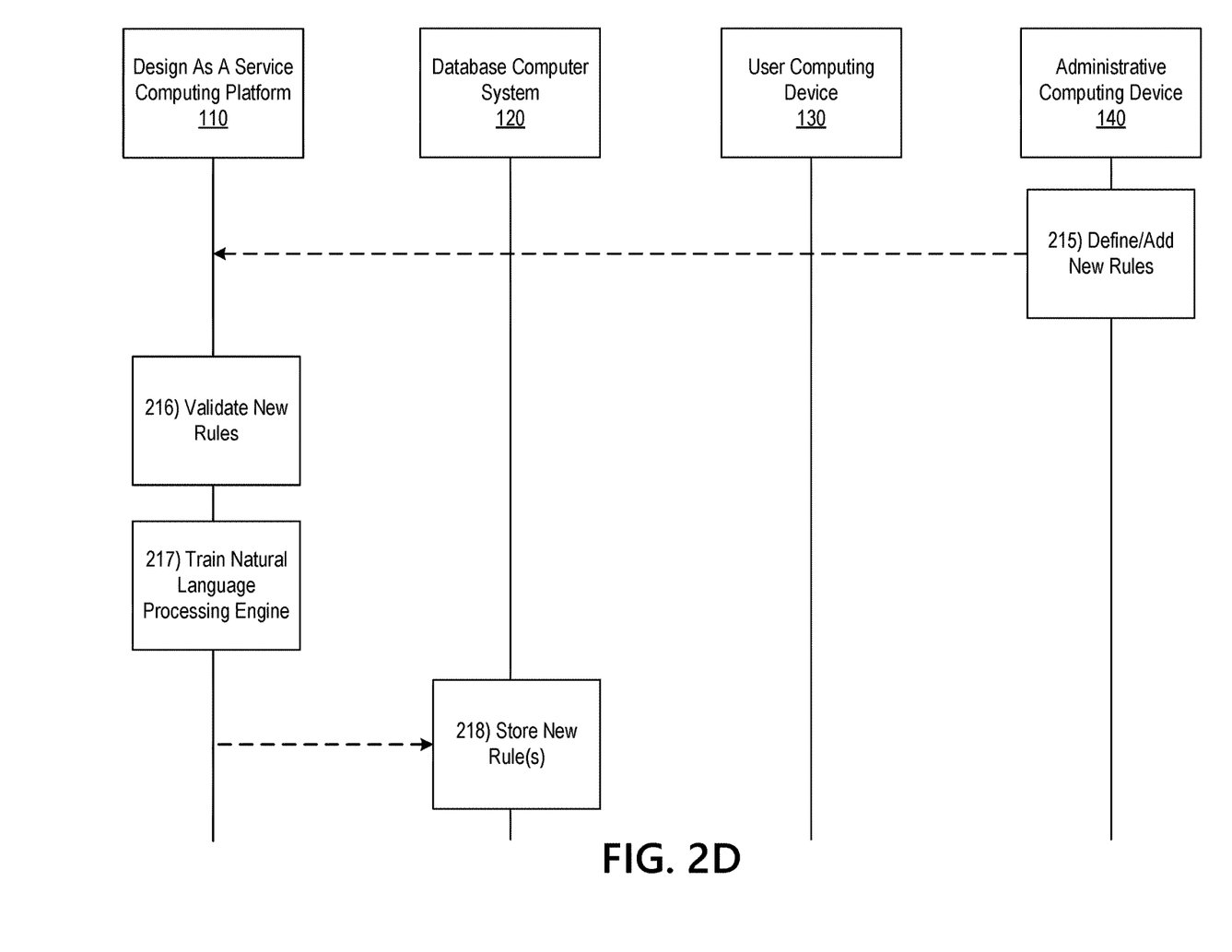

Referring to FIG. 2D, at step 215, a user of a computing device (e.g., administrative computing device 140) may add custom rules to a rules engine (e.g., based on enterprise-specific requirements). For example, a user of a computing device (e.g., administrative computing device 140) may enhance a rule set by adding new component diagram shapes, adding new types of diagrams, and/or the like to a rules engine (e.g., rules module 1120. In turn, at step 216, design as a service computing platform 110 may validate the new rules. At step 217, design as a service computing platform 110 may train a natural language processing engine based on the new rules. The natural language processing engine can then provide up-to-date responses to a user's request (e.g., of user computing device 130). In addition, rules may be modified or changed in a similar manner when desired or required. At step 218, design as a service computing platform 110 may store the new rules in at least one database (e.g., database computer system 120), which may be maintained by the computing platform or any of the devices described herein.

Figure 5:
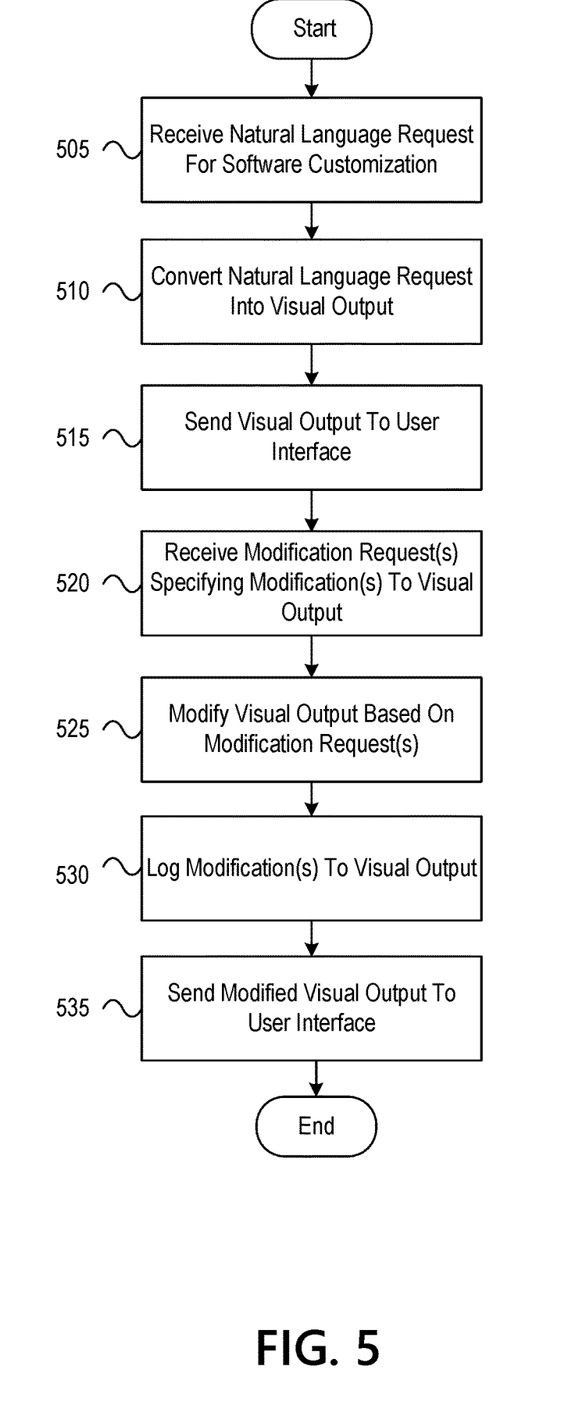
FIG. 5 depicts an illustrative method for design as a service for configuring custom software in accordance with one or more example embodiments.

FIG. 5 depicts an illustrative method for design as a service for configuring custom software in accordance with one or more example embodiments. Referring to FIG. 5, at step 505, a computing platform having at least one processor, a communication interface, and memory may receive natural language input from a user specifying a software customization request. At step 510, the computing platform may convert the natural language input into a visual output corresponding to the software customization request. At step 515, the computing platform may send the visual output corresponding to the software customization request to a user interface. At step 520, the computing platform may receive a modification request from the user specifying, using natural language, one or more modifications to the visual output. At step 525, the computing platform may modify, using natural language processing, the visual output based on the modification request. At step 530, the computing platform may log the one or more modifications to the visual output in a tracking log. At step 535, the computing platform may send the modified visual output to the user interface.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, natural language input from a user specifying a software customization request;
      convert the natural language input into a visual output corresponding to the software customization request;
      send, via the communication interface, the visual output corresponding to the software customization request to a user interface;
      receive, via the communication interface, a modification request from the user specifying, using natural language, one or more modifications to the visual output;
      modify, using natural language processing, the visual output based on the modification request;
      log the one or more modifications to the visual output in a tracking log; and
      send, via the communication interface, the modified visual output to the user interface.

2. The computing platform of claim 1, wherein receiving the natural language input from the user specifying the software customization request comprises receiving voice or text input from the user.

3. The computing platform of claim 1, wherein converting the natural language input into the visual output comprises converting the natural language input into one or more of: a layout drawing, a timeline, a flowchart, or a mockup of a user interface.

4. The computing platform of claim 1, wherein converting the natural language input into the visual output comprises converting the natural language input based on one or more templates stored in a template library.

5. The computing platform of claim 4, wherein converting the natural language input based on the one or more templates stored in the template library comprises converting the natural language input based on one or more validated layouts associated with one or more validated components.

6. The computing platform of claim 1, wherein modifying the visual output based on the modification request comprises modifying the visual output using a natural language processing engine trained on words specific to an enterprise.

7. The computing platform of claim 1, wherein modifying the visual output based on the modification request comprises selecting validated components from a component repository in accordance with a rules engine.

8. The computing platform of claim 1, wherein modifying the visual output based on the modification request comprises evaluating the modification request from the user and providing suggestions associated with the software customization request.

9. The computing platform of claim 1, wherein modifying the visual output based on the modification request comprises:
   identifying user errors; and
   sending notification information to the user based on the identified errors.

10. The computing platform of claim 1, wherein the memory stores additional computer-readable instructions that, when executed by the at least one processor, cause the computing platform to:
    add new rules to a rules engine;
    validate the new rules; and
    train a natural language processing engine based on the new rules.

11. The computing platform of claim 1, wherein sending the modified visual output to a user interface comprises sending a visual layout that is validated across different languages and different organizations.

12. A method, comprising:
    at a computing platform comprising at least one processor, a communication interface, and memory:
       receiving, by the at least one processor, via the communication interface, natural language input from a user specifying a software customization request;
       converting, by the at least one processor, the natural language input into a visual output corresponding to the software customization request;
       sending, by the at least one processor, via the communication interface, the visual output corresponding to the software customization request to a user interface;
       receiving, by the at least one processor, via the communication interface, a modification request from the user specifying, using natural language, one or more modifications to the visual output;
       modifying, by the at least one processor, using natural language processing, the visual output based on the modification request;
       logging, by the at least one processor, the one or more modifications to the visual output in a tracking log; and
       sending, by the at least one processor, via the communication interface, the modified visual output to the user interface.

13. The method of claim 12, wherein receiving the natural language input from the user specifying the software customization request comprises receiving voice or text input from the user.

14. The method of claim 12, wherein converting the natural language input into the visual output comprises converting the natural language input into one or more of: a layout drawing, a timeline, a flowchart, or a mockup of a user interface.

15. The method of claim 12, wherein converting the natural language input into the visual output comprises converting the natural language input based on one or more templates stored in a template library.

16. The method of claim 12, wherein modifying the visual output based on the modification request comprises modifying the visual output using a natural language processing engine trained on words specific to an enterprise.

17. The method of claim 12, wherein modifying the visual output based on the modification request comprises selecting validated components from a component repository in accordance with a rules engine.

18. The method of claim 12, wherein modifying the visual output based on the modification request comprises evaluating the modification request from the user and providing suggestions associated with the software customization request.

19. The method of claim 12, wherein modifying the visual output based on the modification request comprises:

identifying user errors; and
sending notification information to the user based on the identified errors.

20. One or more non-transitory computer-readable media storing instructions that, when executed by a computing platform comprising at least one processor, a communication interface, and memory, cause the computing platform to:

receive, via the communication interface, natural language input from a user specifying a software customization request;

convert the natural language input into a visual output corresponding to the software customization request;

send, via the communication interface, the visual output corresponding to the software customization request to a user interface;

receive, via the communication interface, a modification request from the user specifying, using natural language, one or more modifications to the visual output;

modify, using natural language processing, the visual output based on the modification request;

log the one or more modifications to the visual output in a tracking log; and send, via the communication interface, the modified visual output to the user interface.

* * * * *